United States Patent
Sato

(10) Patent No.: US 9,987,662 B2
(45) Date of Patent: Jun. 5, 2018

(54) DRIVE CIRCUIT, VIBRATOR DEVICE, ELECTRONIC APPARATUS, AND MOVING OBJECT

(71) Applicant: Seiko Epson Corporation, Tokyo (JP)

(72) Inventor: Hideki Sato, Suwa (JP)

(73) Assignee: Seiko Epson Corporation (JP)

( * ) Notice: Subject to any disclaimer, the term of this patent is extended or adjusted under 35 U.S.C. 154(b) by 268 days.

(21) Appl. No.: 15/070,403

(22) Filed: Mar. 15, 2016

(65) Prior Publication Data

US 2016/0271649 A1   Sep. 22, 2016

(30) Foreign Application Priority Data

Mar. 17, 2015 (JP) .................. 2015-053143

(51) Int. Cl.
*H01L 41/04* (2006.01)
*B06B 1/02* (2006.01)
*G01P 15/097* (2006.01)
*G01C 19/5712* (2012.01)

(52) U.S. Cl.
CPC ........ *B06B 1/0246* (2013.01); *G01C 19/5712* (2013.01); *G01P 15/097* (2013.01)

(58) Field of Classification Search
CPC ............................ B06B 1/0246; H01L 41/042
USPC ............................................ 310/317, 316.01
See application file for complete search history.

(56) References Cited

U.S. PATENT DOCUMENTS

| 5,596,311 A * | 1/1997 | Bess ................... B06B 1/0246 331/116 R |
| 2016/0129475 A1* | 5/2016 | Nielsen ................ B06B 1/0215 310/317 |

FOREIGN PATENT DOCUMENTS

JP    2003-021518 A    1/2003
JP    2010-261900 A    11/2010

\* cited by examiner

*Primary Examiner* — Derek Rosenau
(74) *Attorney, Agent, or Firm* — Harness, Dickey & Pierce, P.L.C.

(57) ABSTRACT

A drive circuit includes a circuit for feedback oscillation connected to a vibrator to form a feedback oscillation circuit and including a high-pass filter, an oscillation circuit that outputs a periodic signal, and a control circuit that controls whether or not the periodic signal output by the oscillation circuit is supplied to the circuit for feedback oscillation under a condition that the feedback oscillation circuit operates, and controls to bring a state between a first node as an output node and a second node grounded of the high-pass filter into a non-conduction state when the periodic signal is supplied to the circuit for feedback oscillation and bring the state between the first node and the second node into a conduction state when the periodic signal is not supplied to the circuit for feedback oscillation.

20 Claims, 11 Drawing Sheets

DRIVE CIRCUIT, VIBRATOR DEVICE, ELECTRONIC APPARATUS, AND MOVING OBJECT

BACKGROUND

1. Technical Field

The present invention relates to a drive circuit, a vibrator device, an electronic apparatus, and a moving object.

2. Related Art

Patent Document 1 (JP-A-2003-21518) discloses a drive circuit that can shorten a rise time (activation time) until a vibration state of a vibrator is stabilized by supplying output signals of an oscillator to an output node of a high-pass filter of an oscillation loop for oscillation of the vibrator only at activation.

However, in the drive circuit described in Patent Document 1, part of the output signals of the oscillator supplied to the output node of the high-pass filter via a resistance flows to the earth (ground node) via the resistance forming the high-pass filter and does not contribute to the activation operation. Accordingly, there is a problem that it is possible that the shortening effect for the activation time is insufficient.

SUMMARY

An advantage of some aspects of the invention is to provide a drive circuit that can make the activation time shorter than that in related art. Further, an advantage of some aspects of the invention is to provide a vibrator device, an electronic apparatus, and a moving object using the drive circuit.

The invention can be implemented as the following forms or application examples.

Application Example 1

A drive circuit according to this application example includes a circuit for feedback oscillation connected to a vibrator to form a feedback oscillation circuit and including a high-pass filter, an oscillation circuit including a third node that outputs a periodic signal, and a control circuit that controls whether or not the periodic signal is supplied to the circuit for feedback oscillation under a condition that the feedback oscillation circuit operates, and controls to bring a state between a first node as an output node and a second node grounded of the high-pass filter into a non-conduction state when the periodic signal is supplied to the circuit for feedback oscillation and bring the state between the first node and the second node into a conduction state when the periodic signal is not supplied to the circuit for feedback oscillation.

According to the drive circuit of this application example, when the periodic signal output by the oscillation circuit is supplied to the circuit for feedback oscillation, the state between the output node and the grounded node of the high-pass filter is the non-conduction state. Thereby, the current flowing from the output node of the high-pass filter to the ground may be reduced, and the periodic signal may be efficiently used and the time until the oscillator starts to vibrate may be shortened. Therefore, according to the drive circuit of the application example, the activation time until the vibrator stably vibrates may be made shorter than that in related art.

Application Example 2

In the drive circuit according to the application example, the high-pass filter may include a capacitor and a resistance, and the control circuit may include a first switch circuit that is located between the resistance and the second node and brings the state between the first node and second node into the non-conduction state or the conduction state via the resistance.

In the drive circuit according to this application example, the control circuit may control whether or not the periodic signal is supplied to the first node.

According to the drive circuit of this application example, the first switch circuit brings the state between the output node and grounded node of the high-pass filter into the non-conduction state, and thereby, the current flowing from the output node of the high-pass filter to the ground may be reduced when the periodic signal is supplied to the circuit for feedback oscillation. Further, the first switch circuit brings the state between the output node and grounded node of the high-pass filter into the conduction state via the resistance included in the high-pass filter, and thereby, the high-pass filter may be operated when the periodic signal is not supplied to the circuit for feedback oscillation and the accuracy of the oscillation signal by the feedback oscillation circuit may be improved.

Further, according to the drive circuit of this application example, the resistance included in the high-pass filter may be also used as a resistance for supplying the periodic signal to the output node of the high-pass filter, and the drive circuit is advantageous in downsizing.

Application Example 3

In the drive circuit according to the application example, the high-pass filter may include a capacitor and a first resistance, and the control circuit may include a first switch circuit that is located between the first node and the first resistance and brings the state between the first node and second node into the non-conduction state or the conduction state via the first resistance, and a second resistance located between the third node and the first node.

In the drive circuit according to this application example, the control circuit may control whether or not the periodic signal is supplied to the first node via the second resistance.

According to the drive circuit of this application example, the first switch circuit brings the state between the output node and grounded node of the high-pass filter into the non-conduction state, and thereby, the current flowing from the output node of the high-pass filter to the ground may be reduced when the periodic signal is supplied to the circuit for feedback oscillation via the second resistance. Further, the first switch circuit brings the state between the output node and grounded node of the high-pass filter into the conduction state via the first resistance included in the high-pass filter, and thereby, the high-pass filter may be operated when the periodic signal is not supplied to the circuit for feedback oscillation and the accuracy of the oscillation signal by the feedback oscillation circuit may be improved.

Application Example 4

In the drive circuit according to the application example, the control circuit may include a second switch circuit that is located between the third node and the first node and brings a state into a state in which the periodic signal is supplied to the circuit for feedback oscillation or a state in which the periodic signal is not supplied.

According to the drive circuit of this application example, whether or not the periodic signal is supplied to the feedback oscillation circuit may be controlled by the second switch circuit.

Application Example 5

In the drive circuit according to the application example, the control circuit may include an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

In the drive circuit according to this application example, the oscillation monitoring circuit may control the first switch circuit and the second switch circuit based on the oscillation state of the feedback oscillation circuit.

Application Example 6

In the drive circuit according to the application example, the control circuit may include a rectifier circuit that rectifies a signal supplied from the feedback oscillation circuit, and the oscillation monitoring circuit may control whether or not the periodic signal is supplied to the circuit for feedback oscillation and control to bring the state between the first node and the second node into the non-conduction state or the conduction state based on an output signal of the rectifier circuit.

In the drive circuit according to this application example, the oscillation monitoring circuit may control the first switch circuit and the second switch circuit based on the output signal of the rectifier circuit.

According to the drive circuit of these application examples, the control as to whether or not the periodic signal is supplied to the circuit for feedback oscillation and the control to bring the state between the output node and the grounded node of the high-pass filter into the non-conduction state or the conduction state based on an oscillation state of the feedback oscillator circuit may be performed more appropriately.

Application Example 7

A vibrator device according to this application example includes any one of the above described drive circuits and the vibrator.

The vibrator device according to this application example may be a physical quantity detector that detects a physical quantity based on vibrations of the vibrator, or an oscillator that generates periodic signals (oscillation signals) based on vibrations of the vibrator.

Application Example 8

An electronic apparatus according to this application example includes any one of the above described drive circuits.

Application Example 9

A moving object according to this application example includes any one of the above described drive circuits.

According to these application examples, the drive circuit that can make the activation time shorter than that in related art, and thereby, e.g. more reliable vibrator device, electronic apparatus, and moving object with shorter activation times may be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained in detail using the drawings. The embodiments to be explained do not unduly limit the invention described in the appended claims, and not all of the configurations to be explained are essential component elements of the invention.

As below, as a vibrator device of the invention including a vibrator and a drive circuit that oscillates the vibrator, a physical quantity detector will be explained as an example.

1. Physical Quantity Detector

As below, a physical quantity detector (angular velocity detector) that detects an angular velocity as a physical quantity will be explained as an example.

Configuration of Physical Quantity Detector

Figure 1:
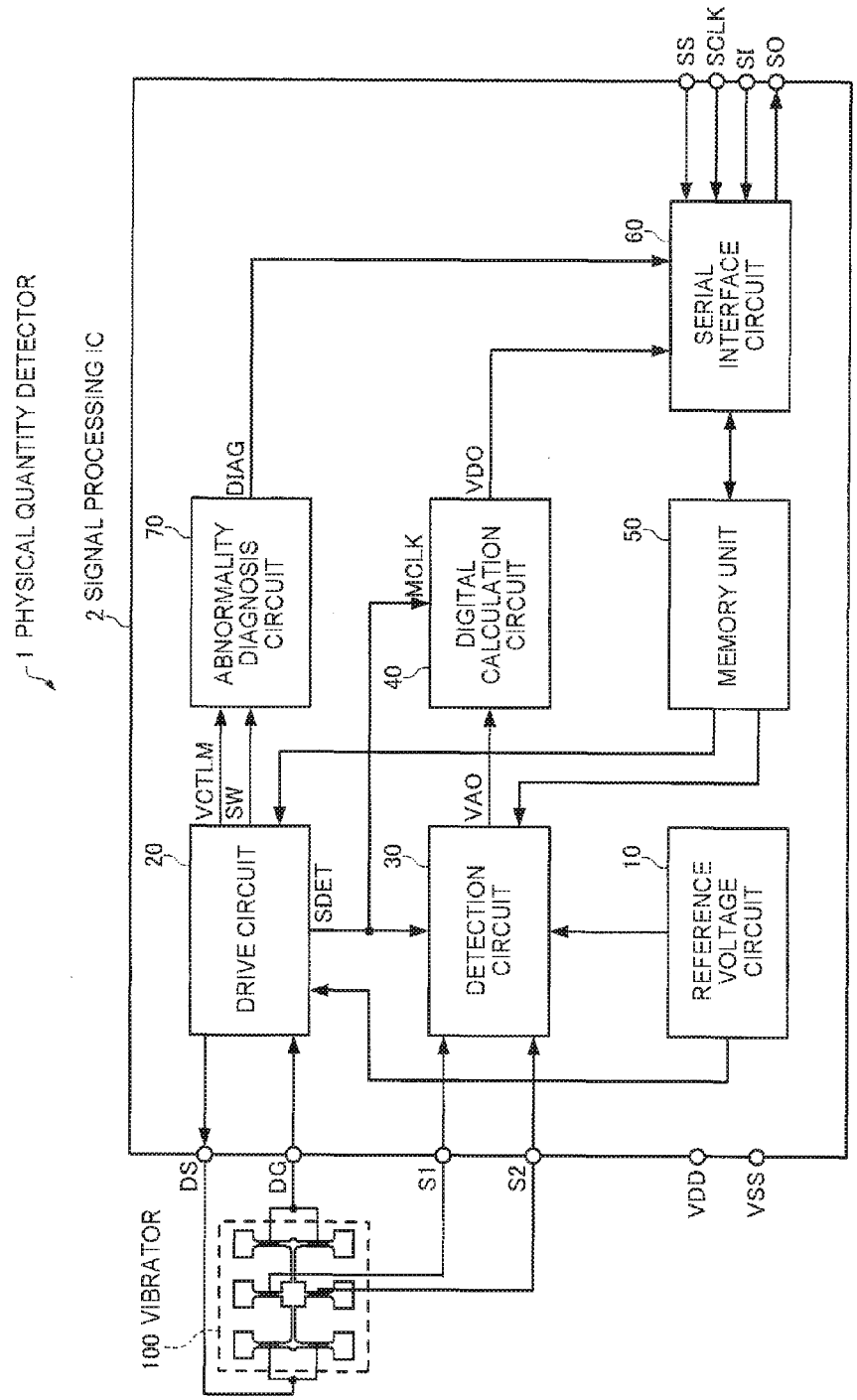
FIG. 1 shows a configuration example of a physical quantity detector of an embodiment.

FIG. 1 is a functional block diagram of a physical quantity detector (angular velocity detector) of an embodiment. The physical quantity detector 1 of the embodiment includes a vibrator (sensor element) 100, and a signal processing integrated circuit (IC) 2.

The vibrator 100 has vibrator elements in which drive electrodes and detection electrodes are provided, and, generally, the vibrator elements are sealed in a package having air-tightness secured for improvement of oscillation efficiency with minimized impedance of the vibrator elements. In the embodiment, the vibrator 100 has the so-called double-T-shaped vibrator elements with two T-shaped drive vibration arms.

Figure 2:
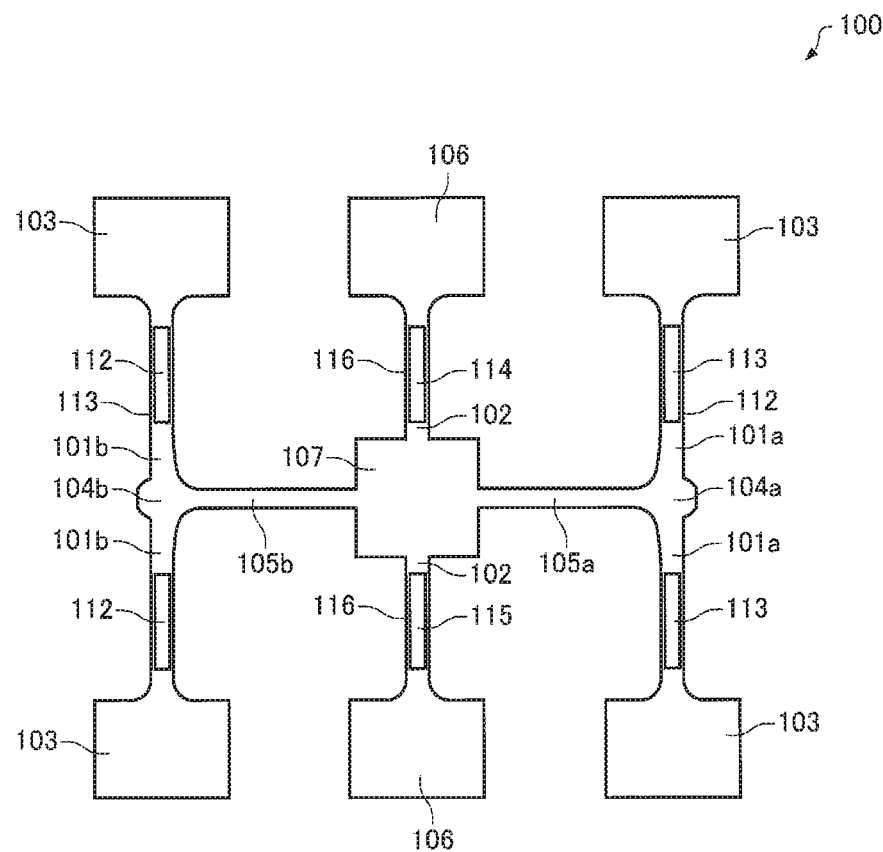
FIG. 2 is a plan view of vibrator elements of a vibrator.

FIG. 2 is a plan view of the vibrator elements of the vibrator 100 of the embodiment. The vibrator 100 has e.g. double-T-shaped vibrator elements as angular velocity sensor elements formed using Z cut quartz crystal substrates.

The vibrator element made of quartz crystal has extremely low fluctuations in resonance frequency with respect to temperature changes, and has an advantage in improvement of the detection accuracy of the angular velocity. Note that an X-axis, a Y-axis, and a Z-axis in FIG. 2 show axes of the quartz crystal.

As shown in FIG. 2, in the vibrator elements of the vibrator 100, drive vibration arms 101a, 101b extend from two drive base portions 104a, 104b in the +Y-axis direction and the −Y-axis direction, respectively. Drive electrodes 112 and 113 are formed on side surfaces and upper surfaces of the drive vibration arms 101a, respectively, and drive electrodes 113 and 112 are formed on side surfaces and upper surfaces of the drive vibration arms 101b, respectively. The drive electrodes 112 and 113 are connected to a drive circuit 20 via a DS terminal and a DG terminal of the signal processing IC 2 shown in FIG. 1, respectively.

The drive base portions 104a, 104b are connected to a rectangular detection base portion 107 via connecting arms 105a, 105b extending in the −X-axis direction and the +X-axis direction, respectively.

Detection vibration arms 102 extend from the detection base portion 107 in the +Y-axis direction and the −Y-axis direction. Detection electrodes 114 and 115 are formed on the upper surfaces of the detection vibration arms 102, and common electrodes 116 are formed on side surfaces of the detection vibration arms 102. The detection electrodes 114 and 115 are connected to a detection circuit 30 via an S1 terminal and an S2 terminal of the signal processing IC 2 shown in FIG. 1, respectively. Further, the common electrodes 116 are grounded.

Figure 3:
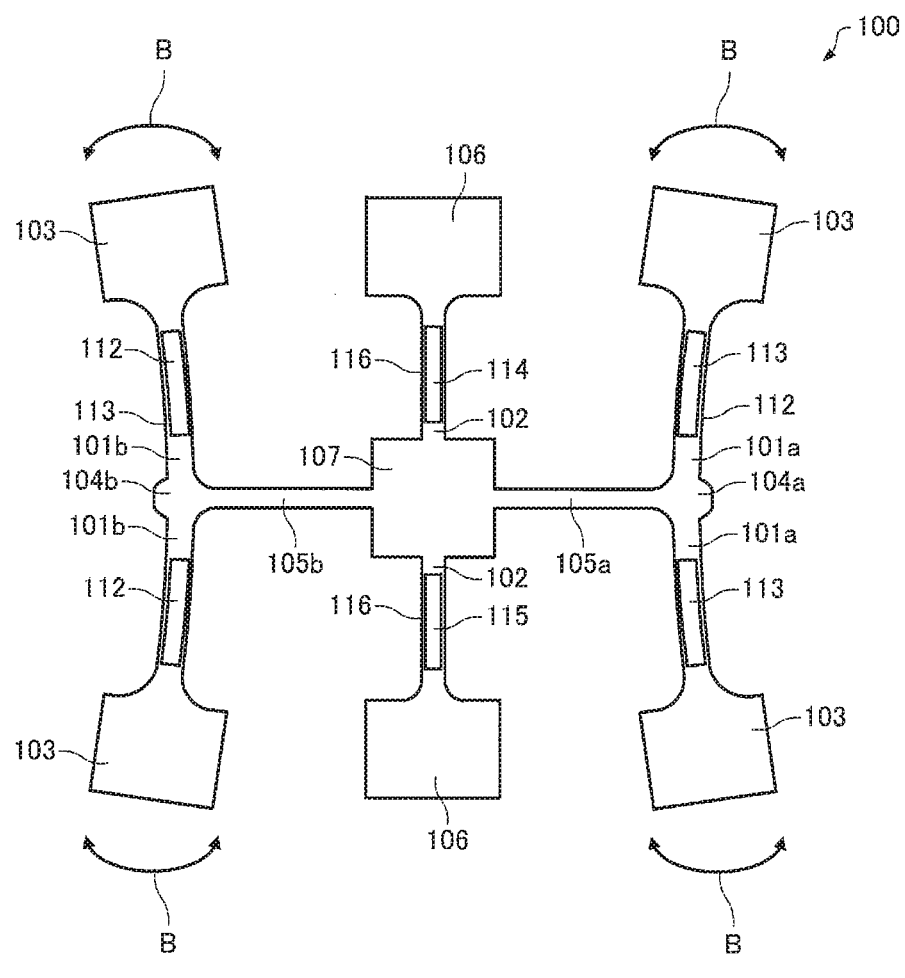
FIG. 3 is a diagram for explanation of an action of the vibrator.

When alternating-current voltages are applied as drive signals between the drive electrodes 112 and the drive electrodes 113 of the drive vibration arms 101a, 101b, as shown in FIG. 3, the drive vibration arms 101a, 101b perform flexural vibrations (excitation vibrations) of repeatedly moving tip ends of the two drive vibration arms 101a, 101b closer to and away from each other as shown by arrows B due to the inverse piezoelectric effect.

Figure 4:
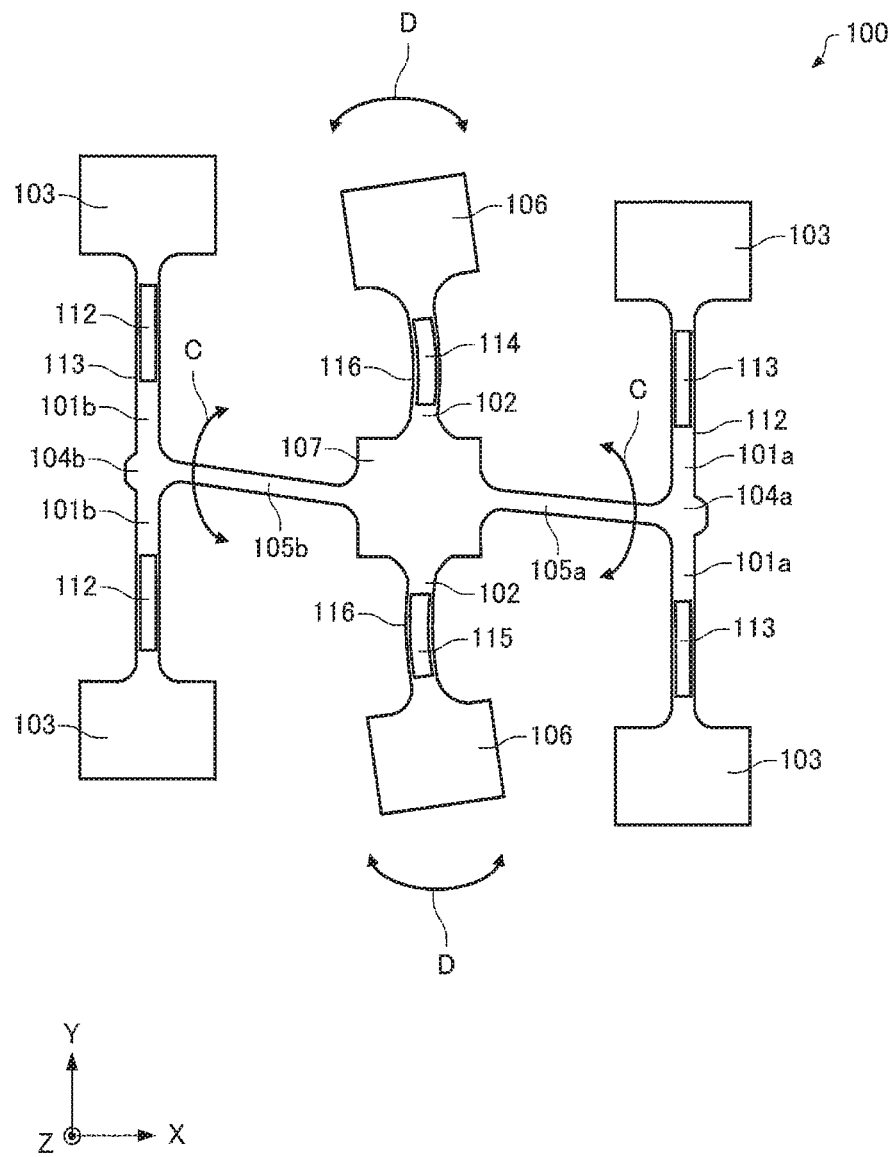
FIG. 4 is a diagram for explanation of an action of the vibrator.

Under the condition, when an angular velocity about the Z-axis as a rotation axis is applied to the vibrator elements of the vibrator 100, the drive vibration arms 101a, 101b obtain a Coriolis force in a direction perpendicular to the directions of the flexural vibrations of the arrows B and the Z-axis. As a result, as shown in FIG. 4, the connecting arms 105a, 105b vibrate as shown by arrows C. Then, the detection vibration arms 102 perform flexural vibrations as shown by arrows D in conjunction with the vibrations of the connecting arms 105a, 105b (arrows C). The flexural vibrations of the detection vibration arms 102 according to the Coriolis force and the flexural vibrations (excitation vibrations) of the drive vibration arms 101a, 101b have a phase difference of 90 degrees.

If the magnitude of the vibration energy when the drive vibration arms 101a, 101b perform flexural vibrations (excitation vibrations) or the magnitudes of the amplitudes of the vibrations are equal between the two drive vibration arms 101a, 101b, the vibration energy of the drive vibration arms 101a, 101b is balanced and the detection vibration arms 102 do not flexurally vibrate under a condition with no angular velocity applied to the vibrator 100. However, if the balance of the vibration energy of the drive vibration arms 101a, 101b is lost, flexural vibrations are generated in the detection vibration arms 102 even under the condition with no angular velocity applied to the vibrator 100. The flexural vibrations are called leakage vibrations, and flexural vibrations of the arrows D like the vibrations based on the Coriolis force having the same phase as the drive signals.

Then, alternating-current charge based on these flexural vibrations is generated in the detection electrodes 114 and 115 of the detection vibration arms 102 due to the piezoelectric effect. Here, alternating-current charge generated based on the Coriolis force changes according to the magnitude of the Coriolis force (in other words, the magnitude of the angular velocity applied to the vibrator 100). On the other hand, alternating-current charge generated based on the leakage vibrations is constant regardless of the magnitude of the angular velocity applied to the vibrator 100.

Note that rectangular weight portions 103 wider than the drive vibration arms 101a, 101b are formed on tip ends of the drive vibration arms 101a, 101b. The weight portions 103 are formed on the tip ends of the drive vibration arms 101a, 101b, and thereby, the Coriolis force may be increased and a desired resonance frequency may be obtained with relatively short vibration arms. Similarly, weight portions 106 wider than the detection vibration arms 102 are formed on tip ends of the detection vibration arms 102. The weight portions 106 are formed on the tip ends of the detection vibration arms 102, and thereby, the alternating-current charge generated in the detection electrodes 114 and 115 may be increased.

In the above described manner, the vibrator 100 outputs the alternating-current charge based on the Coriolis force about the Z-axis as the detection axis (angular velocity component) and the alternating-current charge based on the leakage vibrations of the excitation vibrations (vibration leakage component) via the detection electrodes 114 and 115.

Returning to FIG. 1, the signal processing IC 2 of the embodiment includes a reference voltage circuit 10, the drive circuit 20, the detection circuit 30, a digital calculation circuit 40, a memory unit 50, a serial interface circuit 60, and an abnormality diagnosis circuit 70. Note that the signal processing IC 2 of the embodiment may have a configuration in which part of these elements is omitted or changed or another element is added.

The reference voltage circuit 10 generates a constant voltage such as a reference voltage (analog ground voltage) and a constant current from the power supply voltage supplied from a VDD terminal of the signal processing IC 2, and supplies them to the drive circuit 20 and the detection circuit 30.

The drive circuit 20 generates drive signals for excitation vibrations of the vibrator 100, and supplies the signals to the drive electrodes 112 of the vibrator 100 via the DS terminal. Further, oscillation currents generated in the drive electrodes 113 due to the excitation vibrations of the vibrator 100 are input to the drive circuit 20 via the DG terminal, and the circuit performs feedback control of the amplitude level of the drive signals so that the amplitudes of the oscillation currents may be held constant. Furthermore, the drive circuit 20 generates detection signals SDET having the same phase as the drive signals and outputs the signals to the detection circuit 30. In addition, the drive circuit 20 supplies the detection signals SDET to the digital calculation circuit 40 as master clock signals MCLK.

Further, the drive circuit 20 monitors the oscillation state of the vibrator 100 and generates monitor signals SW showing whether the oscillation amplitudes are larger or smaller than a reference value, monitors the drive signals and generates monitor signals VCTLM showing whether or not the amplitudes of the drive signals are smaller than a lower limit value, and outputs the monitor signals SW and the monitor signals VCTLM to the abnormality diagnosis circuit 70.

The abnormality diagnosis circuit 70 makes diagnoses as to whether the signal processing IC 2 and the vibrator 100 are in normal states or abnormal states based on the monitor signals SW, the monitor signals VCTLM, and other monitor signals (not shown), and generates and outputs diagnosis signals DIAG showing normality or abnormality.

The alternating-current charge (detection currents) generated in the two detection electrodes 114 and 115 of the vibrator 100 is input to the detection circuit 30 via the S1 terminal and the S2 terminal, respectively, and the circuit detects the angular velocity component contained in the alternating-current charge (detection currents) using the detection signal SDET and generates and outputs a signal (angular velocity signal) VAO at the voltage level according to the magnitude of the angular velocity component.

The digital calculation circuit 40 operates by the master clock signal MCLK, converts the voltage level of the angular velocity signal VAO output by the detection circuit 30 into a digital value, and then, performs various kinds of calculation processing and generates and outputs digital data VDO representing the angular velocity.

The memory unit 50 has a non-volatile memory (not shown), and various kinds of trimming data (adjustment data and correction data) for the drive circuit 20 and the detection circuit 30 are stored in the non-volatile memory. The non-volatile memory may be formed as e.g. a MONOS (Metal Oxide Nitride Oxide Silicon)-type memory or an EEPROM (Electrically Erasable Programmable Read-Only Memory). Further, the memory unit 50 may have a register (not shown), and the various kinds of trimming data stored in the non-volatile memory when the power of the signal processing IC 2 is turned on (when the voltage of the VDD terminal rises from 0 V to a desired voltage) may be transferred to the register and held therein and the various kinds of trimming data held in the register may be supplied to the drive circuit 20 and the detection circuit 30.

The serial interface circuit 60 performs processing of outputting the digital data VDO, the diagnosis signal DIAG output by the abnormality diagnosis circuit 70, the data stored in the memory unit 50 (the non-volatile memory and the resistor), etc. to an external apparatus, processing of writing the data input from the external apparatus in the memory unit 50 (the non-volatile memory and the resistor), etc. in response to a request from the external apparatus (e.g. MCU (Micro Control Unit) or the like) of the signal processing IC 2. The serial interface circuit 60 is e.g. an interface circuit of an SPI (Serial Peripheral Interface) bus, and selection signals, clock signals, data signals are input to the circuit from the external apparatus via an SS terminal, an SCLK terminal, and an SI terminal of the signal processing IC 2, respectively, and the circuit outputs the data signals to the external apparatus via an SO terminal of the signal processing IC 2. Note that the serial interface circuit 60 may be an interface circuit compatible with the other various buses than the SPI bus (e.g. I$^2$C (Inter-Integrated Circuit) bus or the like).

Configuration of Detection Circuit

Figure 5:
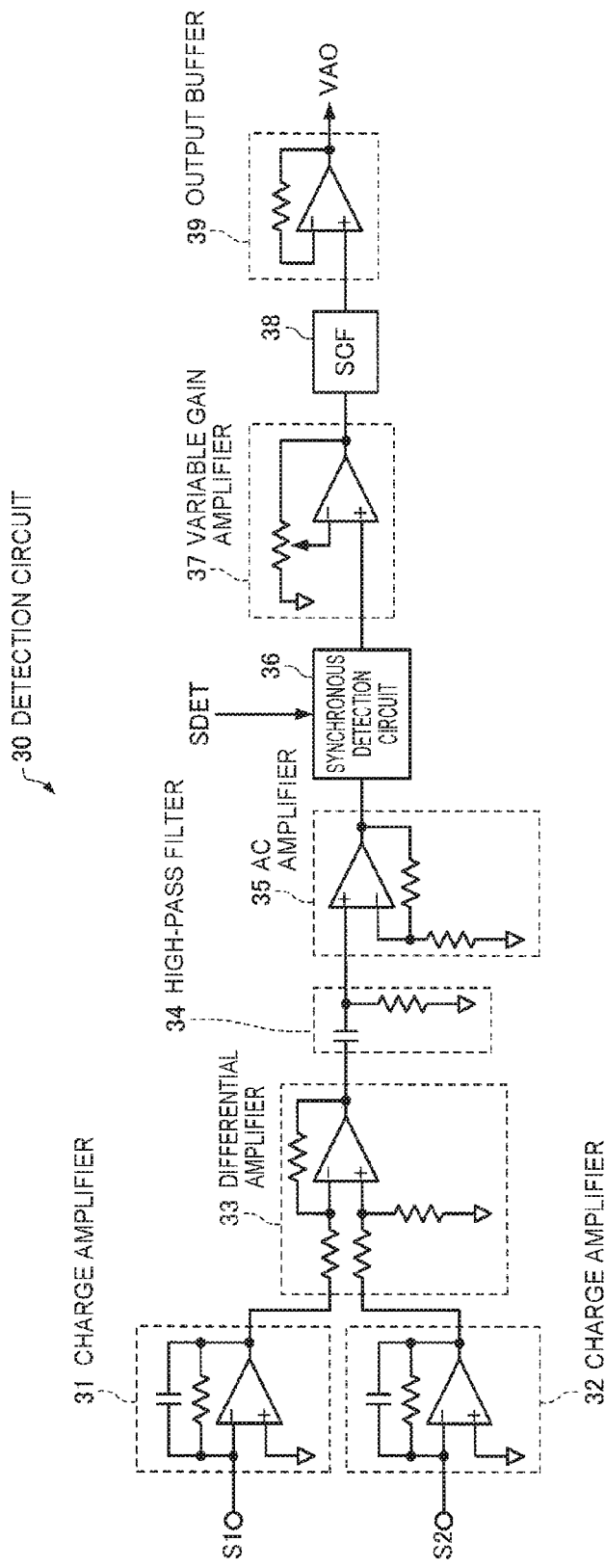
FIG. 5 shows a configuration example of a detection circuit.

Next, the detection circuit 30 will be explained. FIG. 5 shows a configuration example of the detection circuit 30. As shown in FIG. 5, the detection circuit 30 of the embodiment includes charge amplifiers 31, 32, a differential amplifier 33, a high-pass filter (HPF) 34, an AC amplifier 35, a synchronous detection circuit 36, a variable gain amplifier 37, a switched capacitor filter (SCF) 38, and an output buffer 39. Note that the detection circuit 30 of the embodiment may have a configuration in which part of these elements is omitted or changed or another element is added.

Alternating-current charge (detection current) containing the angular velocity component and the vibration leakage component is input from the detection electrode 114 of the vibrator element of the vibrator 100 to the charge amplifier 31 via the S1 terminal. Similarly, alternating-current charge (detection current) containing the angular velocity component and the vibration leakage component is input from the detection electrode 115 of the vibrator element of the vibrator 100 to the charge amplifier 32 via the S2 terminal.

The charge amplifiers 31, 32 respectively convert the input alternating-current charge (detection currents) into alternating-current voltage signals. The alternating-current charge (detection current) input to the charge amplifier 31 and the alternating-current charge (detection current) input to the charge amplifier 32 have a phase difference of 180 degrees from each other and an output signal of the charge amplifier 31 and an output signal of the charge amplifier 32 are opposite in phase to each other (have a phase difference of 180 degrees).

The differential amplifier 33 differentially amplifies the output signal of the charge amplifier 31 and the output signal of the charge amplifier 32. By the differential amplifier 33, the in-phase components are cancelled and the reversed-phase components are summing-amplified.

The high-pass filter 34 removes the direct-current components contained in the output signal of the differential amplifier 33.

The AC amplifier 35 outputs an alternating-current voltage signal formed by amplifying the output signal of the high-pass filter 34.

The synchronous detection circuit 36 synchronously detects the angular velocity component contained in the output signal (detected signal) of the AC amplifier 35 using the detection signal SDET output by the drive circuit 20. The synchronous detection circuit 36 may be adapted as e.g. a circuit that selects the output signal of the AC amplifier 35 as it is when the detection signal SDET is at the high level, and selects a signal formed by inverting the output signal of the AC amplifier 35 with respect to the reference voltage when the detection signal SDET is at the low level.

The output signal of the AC amplifier 35 contains the angular velocity component and the vibration leakage component, and the angular velocity component has the same phase as the detection signal SDET and the vibration leakage component has the opposite phase thereto. Accordingly, the angular velocity component is synchronously detected by the synchronous detection circuit 36, however, the vibration leakage component is not detected.

The variable gain amplifier 37 amplifies or attenuates the output signal of the synchronous detection circuit 36 and outputs a signal at a desired voltage level, and the output signal of the variable gain amplifier 37 is input to the switched capacitor filter (SCF) 38.

The switched capacitor filter (SCF) 38 functions as a low-pass filter that removes high-frequency components contained in the output signal of the variable gain amplifier 37 and passes signals in a frequency range determined by the specifications. The frequency characteristics of the switched capacitor filter (SCF) 38 (low-pass filter) are determined by a frequency of the clock signal (not shown) obtained by stable oscillation of the vibrator 100 and a capacity ratio of capacitors (not shown), and there is an advantage that variations in frequency characteristics are extremely small compared to an RC low-pass filter.

The output signal of the switched capacitor filter (SCF) 38 is buffered by the output buffer 39, and amplified or attenuated to a signal at a desired voltage level as appropriate. The output signal of the output buffer 39 is a signal at a voltage level according to the angular velocity and output to the digital calculation circuit 40 as an angular velocity signal.

Configuration of Digital Calculation Circuit

Figure 6:
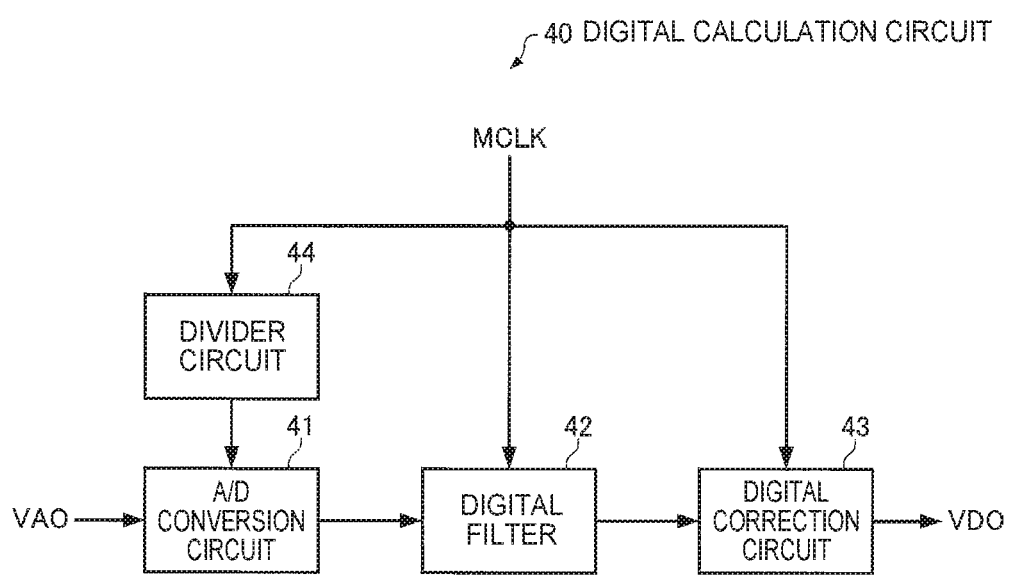
FIG. 6 shows a configuration example of a digital calculation circuit.

Next, the digital calculation circuit 40 will be explained. FIG. 6 shows a configuration example of the digital calculation circuit 40. As shown in FIG. 6, the digital calculation circuit 40 of the embodiment includes an A/D conversion circuit 41, a digital filter 42, a digital correction circuit 43, and a divider circuit 44. Note that the digital calculation circuit 40 of the embodiment may have a configuration in which part of these elements is omitted or changed or another element is added.

The divider circuit 44 outputs a clock signal formed by dividing the master clock signal MCLK (the detection signal SDET output by the drive circuit 20).

The A/D conversion circuit 41 samples the angular velocity signals VAO output by the detection circuit 30 in synchronization with the clock signals output by the divider circuit 44, and converts and outputs the sampled voltage values into digital data.

The digital filter 42 performs filtering processing of the digital data output by the A/D conversion circuit 41 in synchronization with the master clock signal MCLK.

The digital correction circuit 43 performs various kinds of processing of offset correction, sensitivity correction, output range adjustment, bit limitation, etc. on the digital data output by the digital filter 42. Further, the digital correction circuit 43 may perform processing of correcting fluctuations in offset and sensitivity due to power supply voltage fluctuations and temperature fluctuations or the like. Then, the digital correction circuit 43 outputs digital data VDO generated by the various kinds of processing.

Configuration of Drive Circuit

Figure 7:
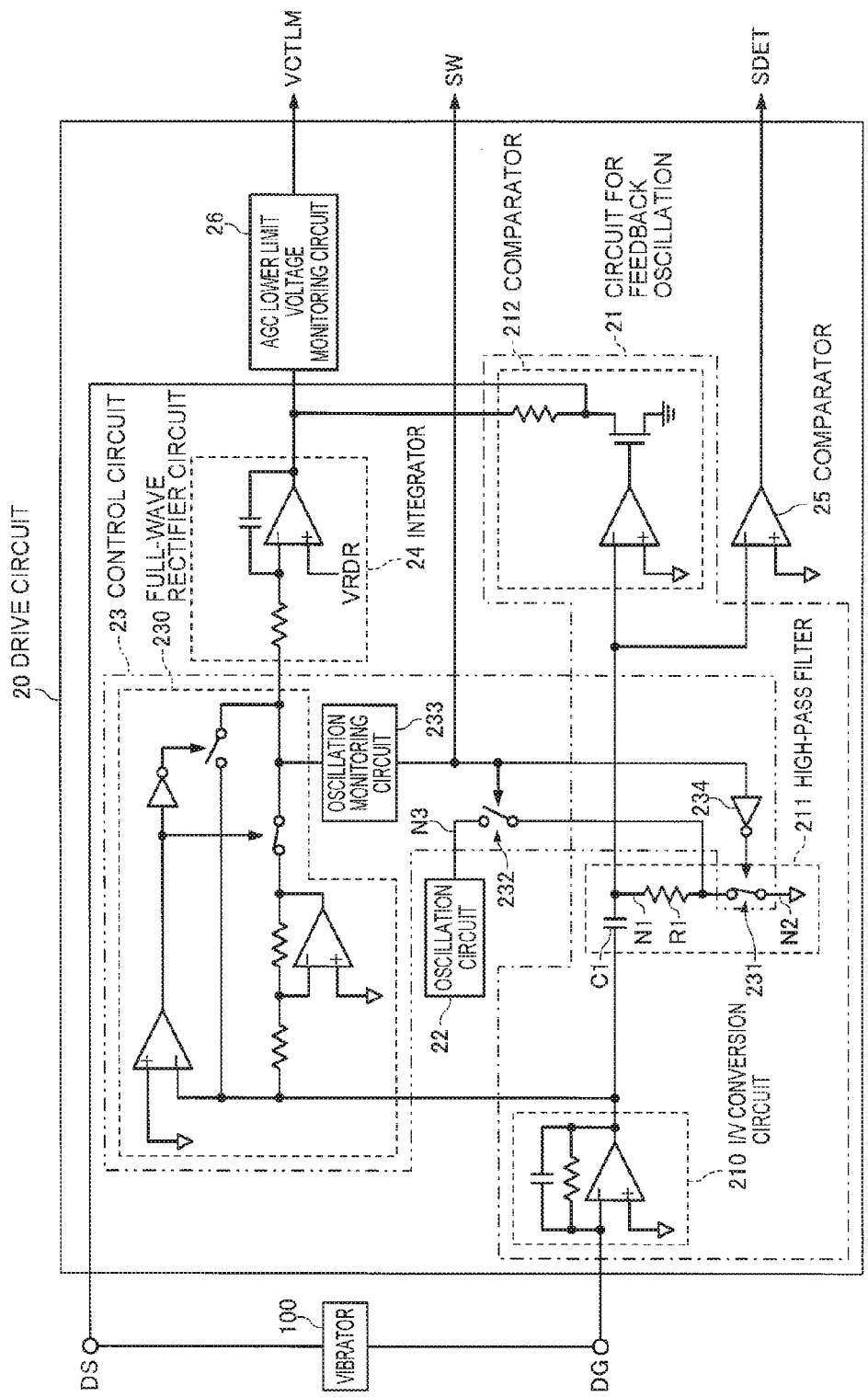
FIG. 7 shows a configuration example of a drive circuit.

Next, the drive circuit 20 will be explained. FIG. 7 shows a configuration example of the drive circuit 20. As shown in FIG. 7, the drive circuit 20 of the embodiment includes a circuit for feedback oscillation 21, an oscillation circuit 22, a control circuit 23, an integrator 24, a comparator 25, and an AGC lower limit monitoring circuit 26. Note that the drive circuit 20 of the embodiment may have a configuration in which part of these elements is omitted or changed or another element is added.

The circuit for feedback oscillation 21 includes an I/V conversion circuit (current-voltage conversion circuit) 210, a high-pass filter (HPF) 211, and a comparator 212, and is connected to the vibrator 100 to form a feedback oscillation circuit. Note that the circuit for feedback oscillation 21 of the embodiment may have a configuration in which part of these elements is omitted or changed or another element is added.

The I/V conversion circuit 210 converts an oscillation current generated by the excitation vibration of the vibrator 100 and input via the DG terminal into an alternating-current voltage signal.

The high-pass filter 211 includes a capacitor C1 and a resistance R1 (an example of a first resistance), and removes the offset of the output signal of the I/V conversion circuit 210.

The comparator 212 compares the voltage of the output signal of the high-pass filter 211 with a reference voltage and generates a binarized signal, and brings an NMOS transistor into conduction and outputs a low level when the binarized signal is at the high level and brings the NMOS transistor into non-conduction and outputs the output voltage of the integrator 24 pulled up via the resistance as a high level. Then, the output signal of the comparator 212 is supplied as a drive signal to the vibrator 100 via the DS terminal. The frequency of the drive signal (drive frequency) is made equal to the resonance frequency of the vibrator 100, and thereby, the vibrator 100 may be stably oscillated.

The oscillation circuit 22 is a circuit that self-oscillates at a frequency near a desired resonance frequency of the vibrator 100 and outputs an oscillation signal as a periodic signal, and formed as e.g. a ring oscillator or a CR oscillation circuit.

The control circuit 23 includes a full-wave rectifier circuit 230, a switch 231, a switch 232, an oscillation monitoring circuit 233, and an inverter circuit 234. Note that the control circuit 23 of the embodiment may have a configuration in which part of these elements is omitted or changed or another element is added. The control circuit 23 controls whether or not the periodic signal (oscillation signal) output by the oscillation circuit 22 is supplied to the circuit for feedback oscillation 21 under a condition that the feedback oscillation circuit operates. Further, the control circuit 23 controls to bring a state between an output node (a node in which the capacitor C1 and the resistance R1 are connected) N1 (an example of a first node) and a ground node N2 (an example of a second node) of the high-pass filter 211 into a non-conduction state when the periodic signal (oscillation signal) output by the oscillation circuit 22 is supplied to the circuit for feedback oscillation 21, and bring the state between the output node N1 and the ground node N2 of the high-pass filter 211 into a conduction state when the periodic signal (oscillation signal) output by the oscillation circuit 22 is not supplied to the circuit for feedback oscillation 21.

The full-wave rectifier circuit 230 (an example of a rectifier circuit) rectifies (full-wave-rectifies) the output signal of the I/V conversion circuit 210 as a signal supplied from the feedback oscillation circuit, and outputs a signal rectified at the voltage level according to the oscillation amplitude of the feedback oscillation circuit.

The oscillation monitoring circuit 233 controls whether or not the periodic signal (oscillation signal) output by the oscillation circuit 22 is supplied to the circuit for feedback oscillation 21 and controls the state between the output node N1 and the ground node N2 of the high-pass filter 211 into the non-conduction state or the conduction state based on the oscillation state of the feedback oscillation circuit. Specifically, the oscillation monitoring circuit 233 compares the voltage of the output signal of the full-wave rectifier circuit 230 with a predetermined threshold voltage, and generates and outputs a monitor signal SW showing whether the oscillation amplitude of the feedback oscillation circuit is larger or smaller than a reference value in response to a comparison result. In the embodiment, the monitor signal SW is at the low level when the oscillation amplitude of the feedback oscillation circuit is larger than the reference value and at the high level when the oscillation amplitude is smaller than the reference value.

The inverter circuit 234 inverts polarity (high level/low level) of the monitor signal SW and outputs the signal.

The switch 231 (an example of a first switch circuit) is located between the resistance R1 and the ground node N2 of the high-pass filter 211, and brings the state between the output node N1 and the ground node N2 of the high-pass filter 211 into the non-conduction state or the conduction state.

The switch 232 (an example of a second switch circuit) is located between the output node N3 (an example of a third node) of the oscillation circuit 22 and the output node N1 of the high-pass filter 211, and brings the state into a state in which the periodic signal (oscillation signal) output by the oscillation circuit 22 is supplied to the circuit for feedback oscillation 21 (specifically, the output node N1 of the high-pass filter 211) or a state in which the signal is not supplied.

In the embodiment, the switch 231 turns on/off by the monitor signal SW as a control signal and the switch 232 turns on/off by the output signal of the inverter circuit 234 as the inversion signal of the monitor signal SW as a control signal, and the switch 231 and the switch 232 turn on/off exclusively for each other. Specifically, when the monitor signal SW is at the low level, the switch 231 turns on and brings the state between the output node N1 and the ground node N2 of the high-pass filter 211 into the conduction state and the switch 232 turns off and brings the state into the state in which the periodic signal (oscillation signal) output by the oscillation circuit 22 is not supplied to the output node N1 of the high-pass filter 211. Further, when the monitor signal SW is at the high level, the switch 231 turns off and brings the state between the output node N1 and the ground node N2 of the high-pass filter 211 into the non-conduction state and the switch 232 turns on and brings the state into the state in which the periodic signal (oscillation signal) output by the oscillation circuit 22 is supplied to the output node N1 via the resistance R1 of the high-pass filter 211.

The integrator 24 integrates and outputs the output voltage of the full-wave rectifier circuit 230 with reference to a desired voltage VRDR supplied from the reference voltage circuit 10. The output voltage of the integrator 24 is lower as the output of the full-wave rectifier circuit 230 is higher (as the amplitude of the output signal of the I/V conversion circuit 210 is larger.) Therefore, as the oscillation amplitude of larger, the high-level voltage of the output signal (drive signal) of the comparator 212 is lower and, as the oscillation amplitude is smaller, the high-level voltage of the output signal (drive signal) of the comparator 212 is higher, and thus, auto gain control (AGC) is performed so that the oscillation amplitude may be held constant.

The comparator 25 amplifies the voltage of the output signal of the high-pass filter 211, and generates and outputs a binarized signal (square-wave voltage signal) as the detection signal SDET.

The AGC lower limit monitoring circuit 26 compares the output voltage of the integrator 24 (the high-level voltage of the drive signal) with a predetermined lower limit voltage, and generates and outputs a monitor signal VCTLM showing whether or not the amplitude of the drive signal is smaller than the lower limit value. In the embodiment, the monitor signal VCTLM is at the low level when the amplitude of the drive signal is larger than the lower limit value and at the high level when the amplitude is smaller than the lower limit value.

Figure 8:
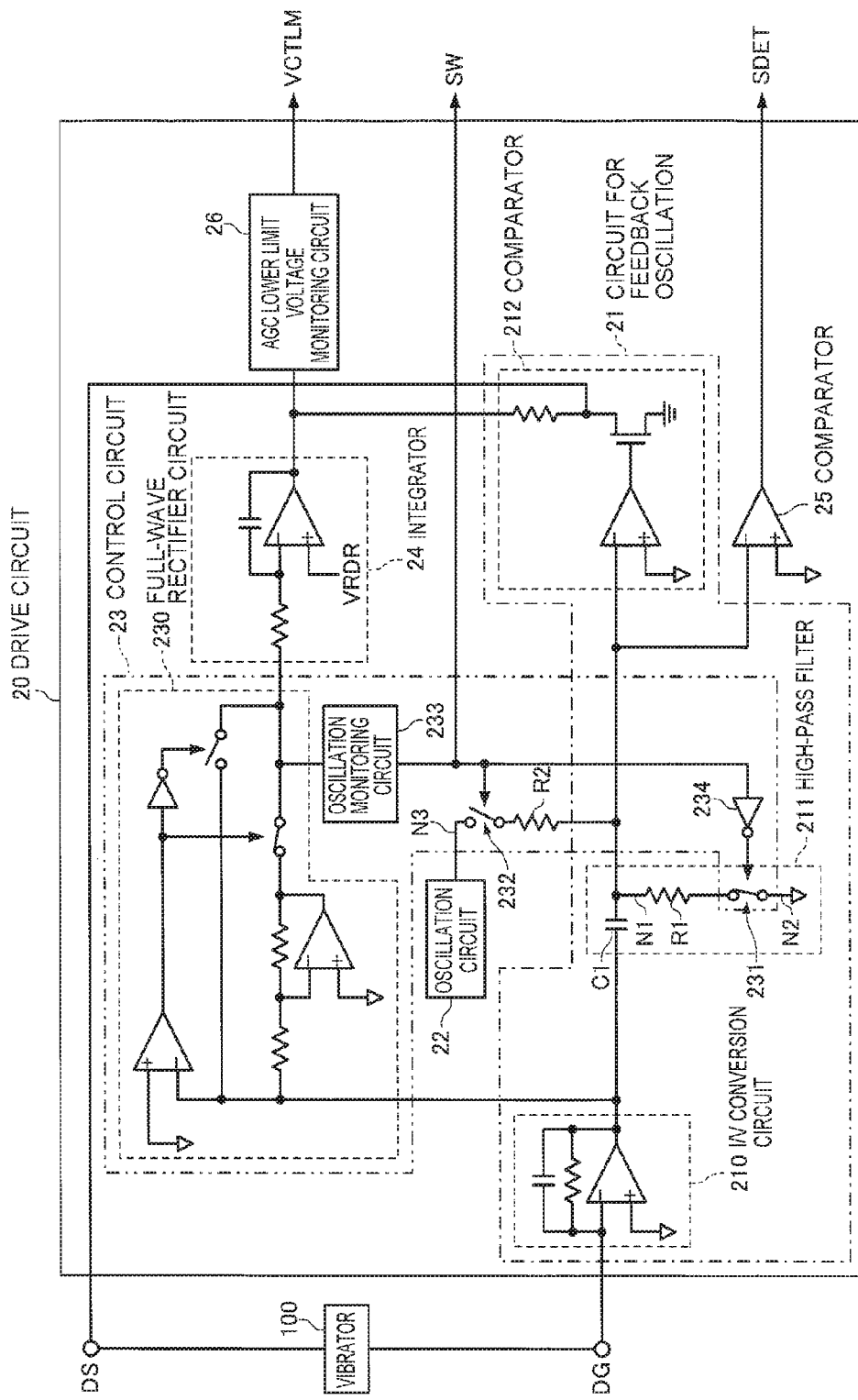
FIG. 8 shows another configuration example of the drive circuit.
Figure 9:
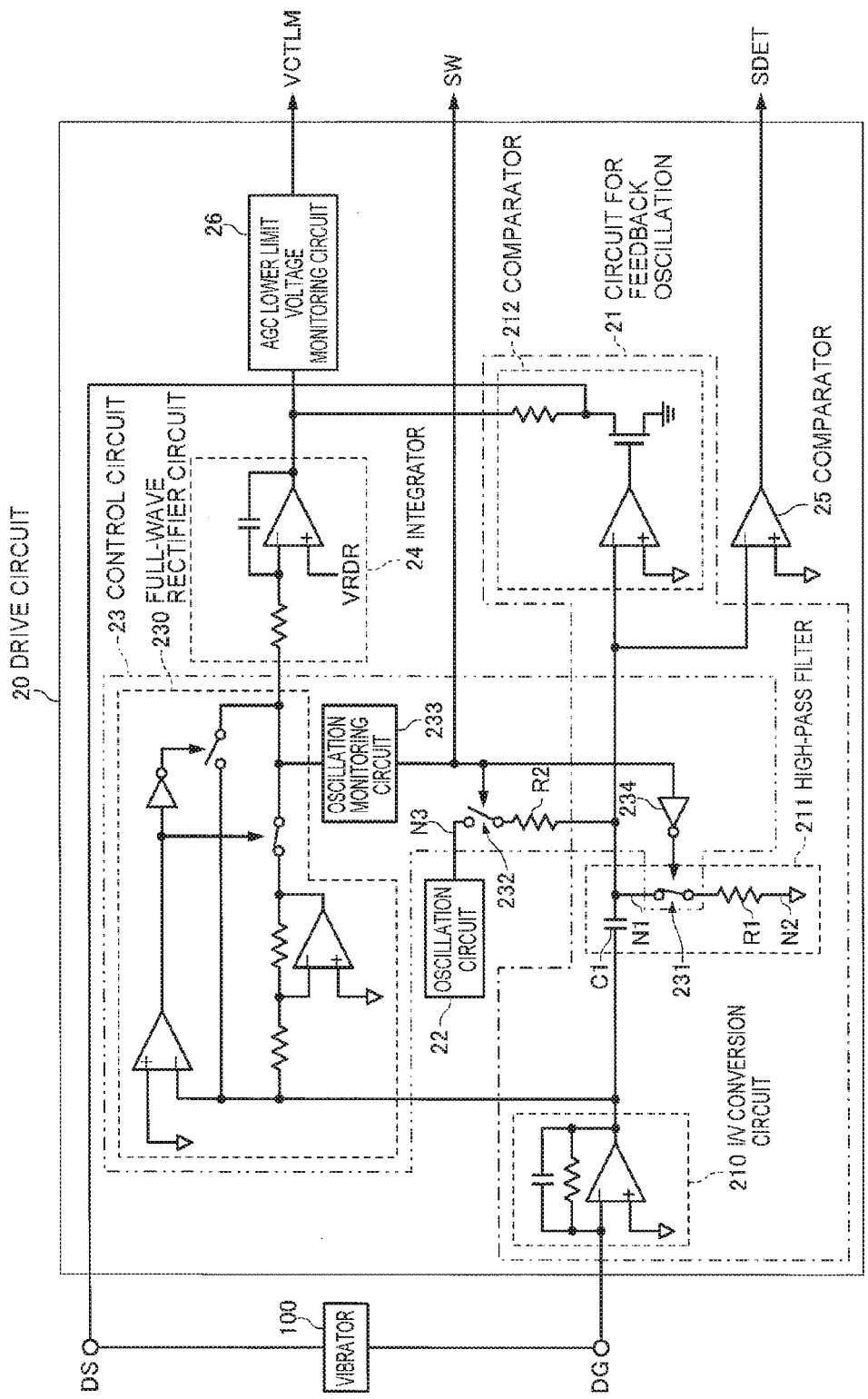
FIG. 9 shows another configuration example of the drive circuit.

FIGS. 8 and 9 show other configuration examples of the drive circuit 20. In FIGS. 8 and 9, the same component elements as those in FIG. 7 have the same signs, and their explanation will be omitted. Both the drive circuit 20 shown in FIG. 8 and the drive circuit 20 shown in FIG. 9 are different from the drive circuit 20 shown in FIG. 7 in that the control circuit 23 includes a resistance R2 (an example of a second resistance) located between the output node N3 of the oscillation circuit 22 and the output node N1 of the high-pass filter 211, and, when the switch 232 is on, the output signal of the oscillation circuit 22 is supplied to the output node N1 of the high-pass filter 211 via the resistance R2. Further, the drive circuit 20 shown in FIG. 9 is different from the drive circuit 20 shown in FIG. 7 in that the switch 231 is located between the output node N1 and the resistance R1 of the high-pass filter 211 and the state between the output node N1 and the ground node N2 of the high-pass filter 211 is brought into a non-conduction state or a conduction state.

Advantages

In any of the drive circuits 20 formed as shown in FIGS. 7 to 9, when the activation is started (at the time when power of the signal processing IC 2 is turned on or the like), the oscillation amplitude of the feedback oscillation circuit (the oscillation amplitude of the vibrator 100) is smaller than the reference value, and the monitor signal SW turns to the high level, the switch 232 turns on, and the output signal (oscillation signal) of the oscillation circuit 22 is supplied to the output node N1 of the high-pass filter 211. The oscillation signal supplied to the output node N1 of the high-pass filter 211 is amplified by the comparator 212 into a drive signal, and supplied to the vibrator 100 via the DS terminal. Concurrently, the switch 231 turns off and the state between the output node N1 and the ground node N2 of the high-pass filter 211 is the non-conduction state, and part of the oscillation signal supplied to the output node N1 of the high-pass filter 211 does not flow to the ground node N2. Therefore, according to the physical quantity detector 1 of the embodiment (drive circuit 20), the oscillation signal output by the oscillation circuit 22 may be efficiently used and the time to start of the oscillation operation at the desired resonance frequency of the vibrator 100 may be shortened, and thereby, the activation time until the vibrator 100 stably oscillates may be made shorter than that in related art.

Note that, according to the drive circuit 20 shown in FIG. 7, the resistance R1 included in the high-pass filter 211 may be also used as a resistance for supplying the oscillation signal output by the oscillation circuit 22 to the output node of the high-pass filter 211, and the drive circuit is advantageous in downsizing.

When the vibrator 100 normally starts the oscillation operation, the oscillation amplitude is gradually larger, and, when the oscillation amplitude is larger than the reference value, the monitor signal SW is at the low level, the switch 232 turns off, and the output signal (oscillation signal) of the oscillation circuit 22 is not supplied to the output node N1 of the high-pass filter 211. Concurrently, the switch 231 turns on, the state between the output node N1 and the ground node N2 of the high-pass filter 211 is brought into the conduction state, and the high-pass filter 211 functions as a high-pass filter. Therefore, according to the physical quantity detector 1 of the embodiment (drive circuit 20), after the vibrator 100 normally starts the oscillation operation, an oscillation signal at a frequency slightly different from the desired resonance frequency of the vibrator 100 is not superimposed on the drive signal and unnecessary low-frequency signals are removed by the high-pass filter 211, and thereby, the vibrator 100 can stably oscillate.

Note that, in order to reduce unnecessary power consumption, after the monitor signal SW is changed from the high level to the low level, it is desirable to stop the oscillation operation of the oscillation circuit 22.

Further, the detection signal SDET is the signal formed by binarization of the output signal of the high-pass filter 211, and thus, becomes the inversion signal of the output signal of the oscillation circuit 22 when the activation starts and, after the monitor signal SW is changed from the high level to the low level, becomes a signal formed by binarization of the oscillation signal by the feedback oscillation circuit. Then, the detection signal SDET becomes the master clock signal of the digital calculation circuit 40, and thus, the digital calculation circuit 40 may start calculation processing immediately after the start of activation (immediately after the power of the signal processing IC 2 is turned on) and the time until the digital calculation circuit 40 normally starts to output the digital data VDO may be shortened. Therefore, the activation time of the whole system including the physical quantity detector 1 and the external apparatus may be shortened. Furthermore, the detection signal SDET is also used as the master clock signal MCLK of the digital calculation circuit 40 immediately after the start of activation, and thereby, a dedicated oscillation circuit for generation of the master clock signal is unnecessary and that is advantageous in reduction in size and cost.

2. Electronic Apparatuses

Figure 10:
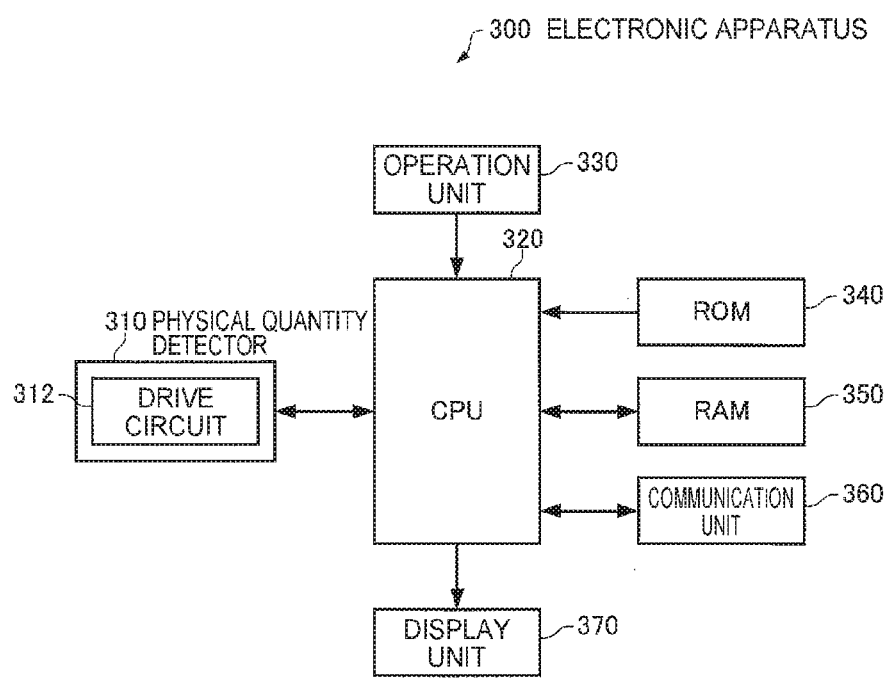
FIG. 10 is a functional block diagram showing an example of a configuration of an electronic apparatus of the embodiment.
Figure 11:
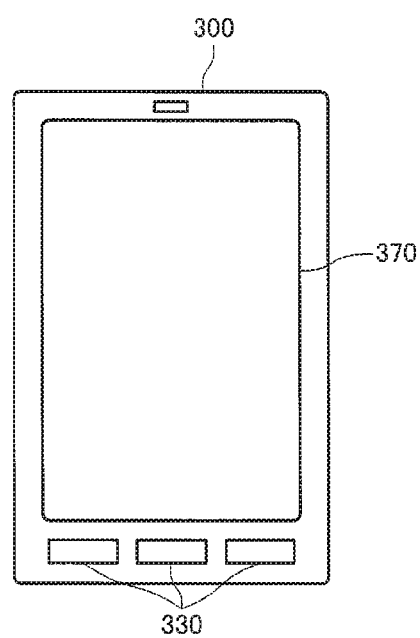
FIG. 11 shows an example of an appearance of the electronic apparatus of the embodiment.

FIG. 10 is a functional block diagram showing an example of a configuration of an electronic apparatus of the embodiment. Further, FIG. 11 shows an example of an appearance of a smartphone as an example of the electronic apparatus of the embodiment.

An electronic apparatus 300 of the embodiment includes a physical quantity detector 310, a CPU (Central Processing Unit) 320, an operation unit 330, a ROM (Read Only Memory) 340, a RAM (Random Access Memory) 350, a communication unit 360, and a display unit 370. Note that the electronic apparatus of the embodiment may have a configuration in which part of the component elements (respective parts) in FIG. 10 is omitted or changed or another component element is added.

The physical quantity detector 310 (an example of a vibrator device) is a device that detects a physical quantity and outputs a signal at a level according to the detected physical quantity (physical quantity signal), and may be e.g. an inertial sensor that detects at least a part of physical quantities including acceleration, angular velocity, velocity, angular acceleration, force, or an inclinometer that measures an inclination angle. As the physical quantity detector 310, e.g. the above described physical quantity detector 1 of the embodiment may be applied. Further, the physical quantity detector 310 includes a drive circuit 312, and, as the drive circuit 312, e.g. the above described drive circuit 20 of the embodiment may be applied.

The CPU 320 performs various kinds of calculation processing and control processing using signals input from the physical quantity detector 310 according to programs stored in the ROM 340 etc. In addition, the CPU 320 performs various kinds of processing in response to operation signals from the operation unit 330, processing of controlling the communication unit 360 for data communication with an external apparatus, processing of transmitting display signals for display of various kinds of information to the display unit 370, etc.

The operation unit 330 is an input device including an operation key and a button switch, and outputs the operation signals in response to operations by a user to the CPU 320.

The ROM 340 stores programs, data, etc. for the CPU 320 to perform various kinds of calculation processing and control processing.

The RAM 350 is used as a work area of the CPU 320, and temporarily stores the programs and data read from the ROM 340, the data input from the operation unit 330, calculation results from execution by the CPU 320 according to various programs, etc.

The communication unit 360 performs various kinds of control for establishment of data communication between the CPU 320 and the external apparatus.

The display unit 370 is a display device including an LCD (Liquid Crystal Display), and displays various kinds of information based on display signals input from the CPU 320. A touch panel that functions as the operation unit 330 may be provided in the display unit 370.

As the physical quantity detector 310, e.g. the above described physical quantity detector 1 of the embodiment is applied, or, as the drive circuit 312 included in the physical quantity detector 310, e.g. the above described drive circuit 20 of the embodiment is applied, and thereby, the more reliable electronic apparatus with the shorter activation time may be realized.

Various electronic apparatuses are conceivable as the above described electronic apparatus 300, including e.g. personal computers (e.g. mobile personal computers, laptop personal computers, tablet personal computers), moving object terminals such as smartphones and cell phones, digital cameras, inkjet ejection apparatuses (e.g. inkjet printers), storage area network apparatuses such as routers and switches, local area network apparatuses, moving object terminal base station apparatuses, televisions, video cameras, video recorders, car navigation apparatuses, real-time clock apparatuses, pagers, personal digital assistances (with or without communication function), electronic dictionaries, calculators, electronic game machines, game controllers, word processors, work stations, videophones, security television monitors, electronic binoculars, POS terminals, medical apparatuses (e.g., electronic thermometers, sphygmomanometers, blood glucose meters, electrocardiographic measurement apparatuses, ultrasonic diagnostic apparatuses, or electronic endoscopes), fish finders, various measurement instruments, meters and gauges (e.g., meters for vehicles, airplanes, and ships), flight simulators, head mounted displays, motion trace, motion tracking, motion controllers, PDR (pedestrian dead reckoning), etc.

3. Moving Objects

Figure 12:
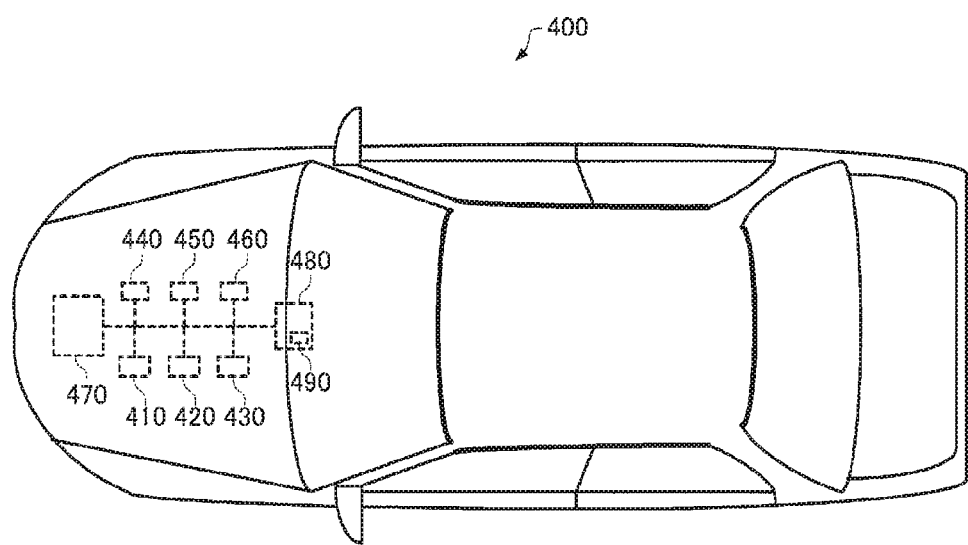
FIG. 12 shows an example of a moving object of the embodiment.

FIG. 12 shows an example of a moving object of the embodiment (top view). A moving object 400 shown in FIG. 12 includes physical quantity detectors 410, 420, 430, controllers 440, 450, 460, a battery 470, and a navigation apparatus 480. Note that the moving object of the embodiment may have a configuration in which part of the elements (respective parts) in FIG. 12 is omitted or changed or another element is added.

The physical quantity detectors 410, 420, 430, the controllers 440, 450, 460, and the navigation apparatus 480 operate by a power supply voltage supplied from the battery 470.

The controllers 440, 450, 460 perform various kinds of control of an attitude control system, a rollover prevention system, a brake system, etc. using part or all of physical quantity signals output by the physical quantity detectors 410, 420, 430, respectively.

The navigation apparatus 480 displays the position of the moving object 400, time, and other various kinds of information on a display based on output information of a built-in GPS receiver (not shown). Further, the navigation apparatus 480 contains a physical quantity detector 490 and, even when radio wave of the GPS is out of reach, performs the position and the orientation of the moving object 400 based on the output signals of the physical quantity detector 490 and continues display of necessary information.

The physical quantity detectors 410, 420, 430, 490 (examples of the vibrator device) are devices that output signals at levels according to the detected physical quantities (physical quantity signals), and e.g. an angular velocity sensor, an acceleration sensor, a velocity sensor, an inclinometer, or the like, respectively.

For example, as the physical quantity detectors 410, 420, 430, 490, the above described physical quantity detector 1 of the embodiment may be applied, or, as drive circuits (not shown) included in the physical quantity detectors 410, 420, 430, 490, the above described drive circuit 20 of the embodiment may be applied, and thereby, the more reliable moving object with the shorter activation time may be realized.

Various moving objects are conceivable as the moving object 400, including e.g. automobiles (including electric cars), aircrafts such as jet airplanes and helicopters, ships, rockets, artificial satellites, etc.

The invention is not limited to the embodiments and various modifications may be made without departing the scope of the invention.

For example, in the drive circuit 20, after the monitor signal SW changes from the high level to the low level, the output of the oscillation circuit 22 may be stopped (e.g. high impedance is provided) and a configuration without the switch 232 may be employed.

Further, for example, the vibrator element of the vibrator 100 is not necessarily the double-T type, but may be a tuning fork type or an inter digital type, or a tuning bar type having a triangular prism shape, a quadrangular prism shape, or a circular cylinder shape. As the material of the vibrator element of the vibrator 100, in place of the quartz crystal ($SiO_2$), e.g. a piezoelectric material including piezoelectric single crystal such as lithium tantalate ($LiTaO_2$) or lithium niobate ($LiNbO_3$) or piezoelectric ceramics including lead zirconate titanate (PZT) may be used, or silicon semiconductor may be used. Or, for example, a piezoelectric thin film of zinc oxide (ZnO), aluminum nitride (AlN), or the like sandwiched between drive electrodes may be provided in a part of a surface of the silicon semiconductor.

Furthermore, for example, the vibrator 100 is not limited to the piezoelectric-type vibrator, but may be electrodynamic, capacitance, eddy-current, optical, or strain-gauge vibration-type vibrator. Or, the type of the vibrator 100 is not limited to the vibration type, but may be e.g. an optical type, a rotation type, or a fluidic type. The physical quantity detected by the vibrator 100 is not limited to the angular velocity, but may be angular acceleration, acceleration, velocity, or force.

In the above described embodiments, as the example of the vibrator device, the physical quantity detector that detects the physical quantity by vibrating (oscillating) the vibrator using the drive circuit is taken. However, the vibrator device may be e.g. an oscillator that generates periodic signals (oscillation signals) by vibrating (oscillating) the vibrator using the drive circuit (oscillation circuit).

The above described embodiments and modified examples are just examples, and the invention is not limited to those. For example, the respective embodiments and the respective modified examples may be appropriately combined.

The invention includes substantially the same configurations (the same configurations in function, method, and result or the same configurations in purpose and advantage) as the configurations explained in the embodiments. Further, the invention includes configurations in which non-essential parts of the configurations explained in the embodiments are replaced. Furthermore, the invention includes configurations that may exert the same effects or achieve the same purposes as those of the configurations explained in the embodiments.

In addition, the invention includes configurations formed by adding known technologies to the configurations explained in the embodiments.

The entire disclosure of Japanese Patent Application No. 2015-053143, filed Mar. 17, 2015 is expressly incorporated by reference herein.

What is claimed is:

1. A drive circuit comprising:
    a circuit for feedback oscillation connected to a vibrator to form a feedback oscillation circuit and including a high-pass filter;
    an oscillation circuit including a third node that outputs a periodic signal; and
    a control circuit that controls whether or not the periodic signal is supplied to the circuit for feedback oscillation under a condition that the feedback oscillation circuit operates, and controls to bring a state between a first node as an output node and a second node grounded of the high-pass filter into a non-conduction state when the periodic signal is supplied to the circuit for feedback oscillation and bring the state between the first node and the second node into a conduction state when the periodic signal is not supplied to the circuit for feedback oscillation.

2. The drive circuit according to claim 1, wherein the high-pass filter includes a capacitor and a resistance, and
    the control circuit includes a first switch circuit that is located between the resistance and the second node and brings the state between the first node and second node into the non-conduction state or the conduction state via the resistance.

3. The drive circuit according to claim 1, wherein the high-pass filter includes a capacitor and a first resistance, and
    the control circuit includes a first switch circuit that is located between the first node and the first resistance and brings the state between the first node and second node into the non-conduction state or the conduction state via the first resistance, and a second resistance located between the third node and the first node.

4. The drive circuit according to claim 1, wherein the control circuit includes a second switch circuit that is located between the third node and the first node and brings a state into a state in which the periodic signal is supplied to the circuit for feedback oscillation or a state in which the periodic signal is not supplied.

5. The drive circuit according to claim 2, wherein the control circuit includes a second switch circuit that is located between the third node and the first node and brings a state into a state in which the periodic signal is supplied to the circuit for feedback oscillation or a state in which the periodic signal is not supplied.

6. The drive circuit according to claim 3, wherein the control circuit includes a second switch circuit that is located between the third node and the first node and brings a state into a state in which the periodic signal is supplied to the circuit for feedback oscillation or a state in which the periodic signal is not supplied.

7. The drive circuit according to claim 1, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

8. The drive circuit according to claim 2, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

9. The drive circuit according to claim 3, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

10. The drive circuit according to claim 4, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

11. The drive circuit according to claim 5, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

12. The drive circuit according to claim 6, wherein the control circuit includes an oscillation monitoring circuit that controls whether or not the periodic signal is supplied to the circuit for feedback oscillation and controls to bring the state between the first node and the second node into the non-conduction state or the conduction state based on an oscillation state of the feedback oscillation circuit.

13. The drive circuit according to claim 7, wherein the control circuit includes a rectifier circuit that rectifies a signal supplied from the feedback oscillation circuit, and
the oscillation monitoring circuit controls whether or not the periodic signal is supplied to the circuit for feedback oscillation and controls to bring the state between the first node and the second node into the non-conduction state or the conduction state based on an output signal of the rectifier circuit.

14. The drive circuit according to claim 8, wherein the control circuit includes a rectifier circuit that rectifies a signal supplied from the feedback oscillation circuit, and
the oscillation monitoring circuit controls whether or not the periodic signal is supplied to the circuit for feedback oscillation and controls to bring the state between the first node and the second node into the non-conduction state or the conduction state based on an output signal of the rectifier circuit.

15. The drive circuit according to claim 9, wherein the control circuit includes a rectifier circuit that rectifies a signal supplied from the feedback oscillation circuit, and
the oscillation monitoring circuit controls whether or not the periodic signal is supplied to the circuit for feedback oscillation and controls to bring the state between the first node and the second node into the non-conduction state or the conduction state based on an output signal of the rectifier circuit.

16. The drive circuit according to claim 10, wherein the control circuit includes a rectifier circuit that rectifies a signal supplied from the feedback oscillation circuit, and
the oscillation monitoring circuit controls whether or not the periodic signal is supplied to the circuit for feedback oscillation and controls to bring the state between the first node and the second node into the non-conduction state or the conduction state based on an output signal of the rectifier circuit.

17. The drive circuit according to claim 11, wherein the control circuit includes a rectifier circuit that rectifies a signal supplied from the feedback oscillation circuit, and
the oscillation monitoring circuit controls whether or not the periodic signal is supplied to the circuit for feedback oscillation and controls to bring the state between the first node and the second node into the non-conduction state or the conduction state based on an output signal of the rectifier circuit.

18. A vibrator device comprising:
the drive circuit according to claim 1; and
the vibrator.

19. An electronic apparatus comprising the drive circuit according to claim 1.

20. A moving object comprising the drive circuit according to claim 1.

* * * * *